April 25, 1950  J. EATON  2,505,388
SELECTIVE VARIABLE CONDITION CONTROL
Filed Jan. 29, 1945   3 Sheets-Sheet 1
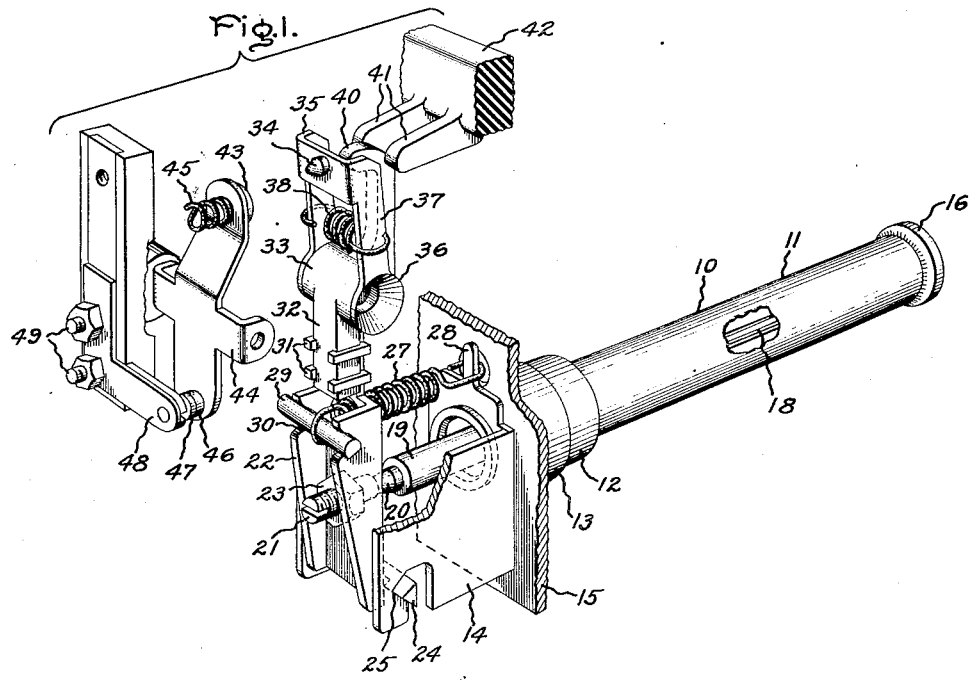
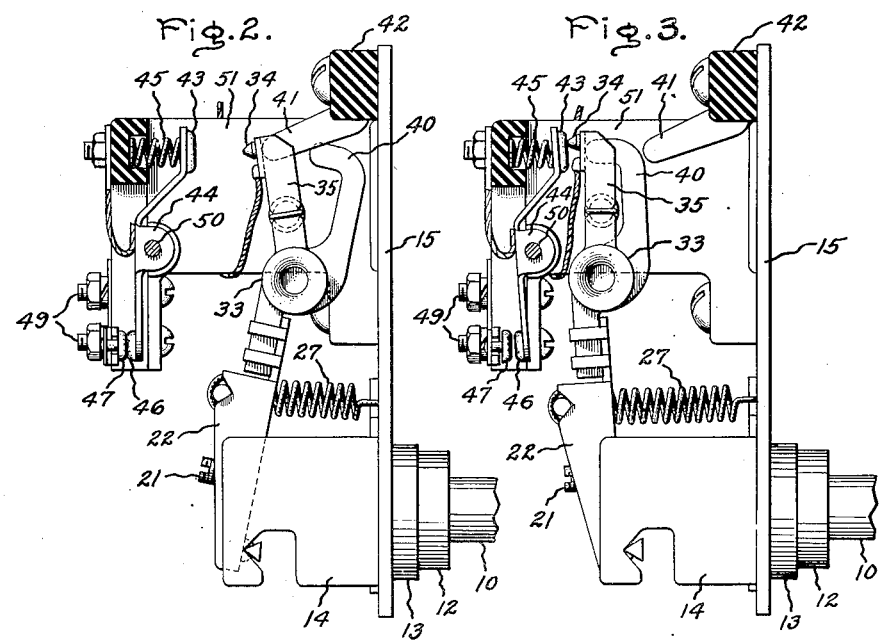
Inventor:
John Eaton,
by Harry E. Dunham
His Attorney.

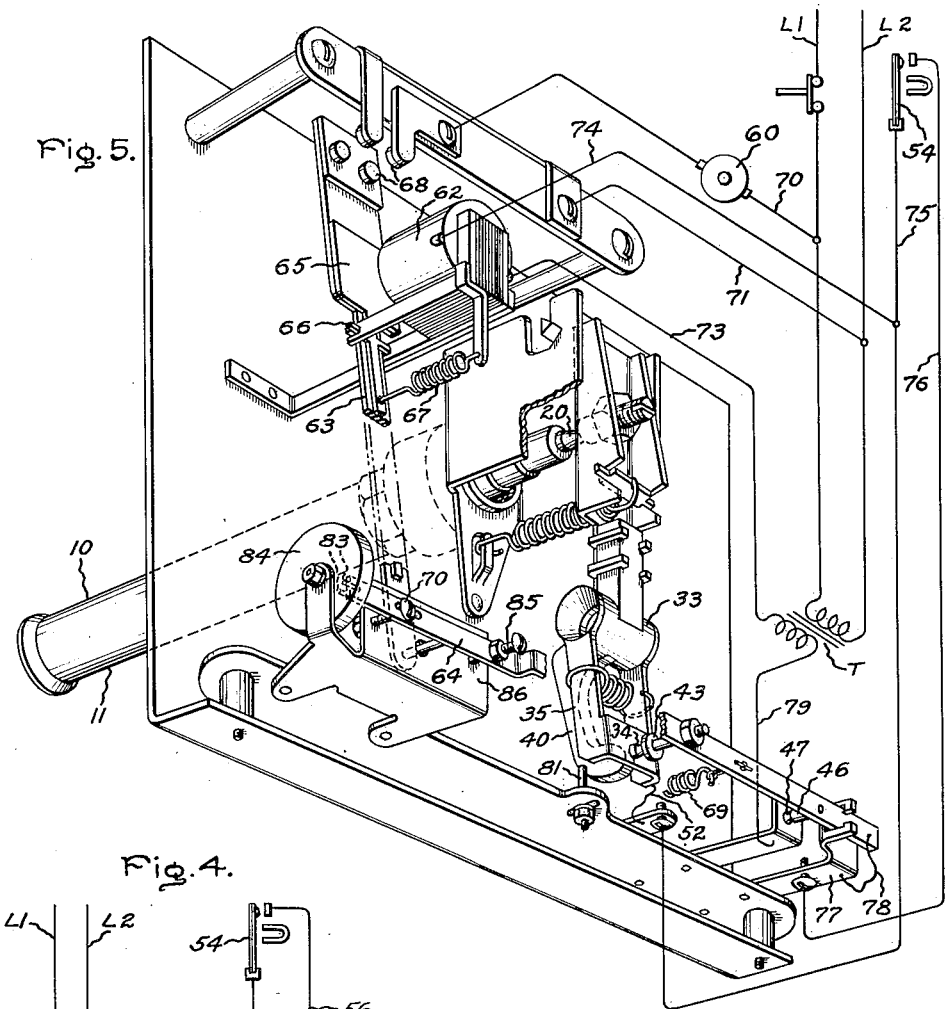

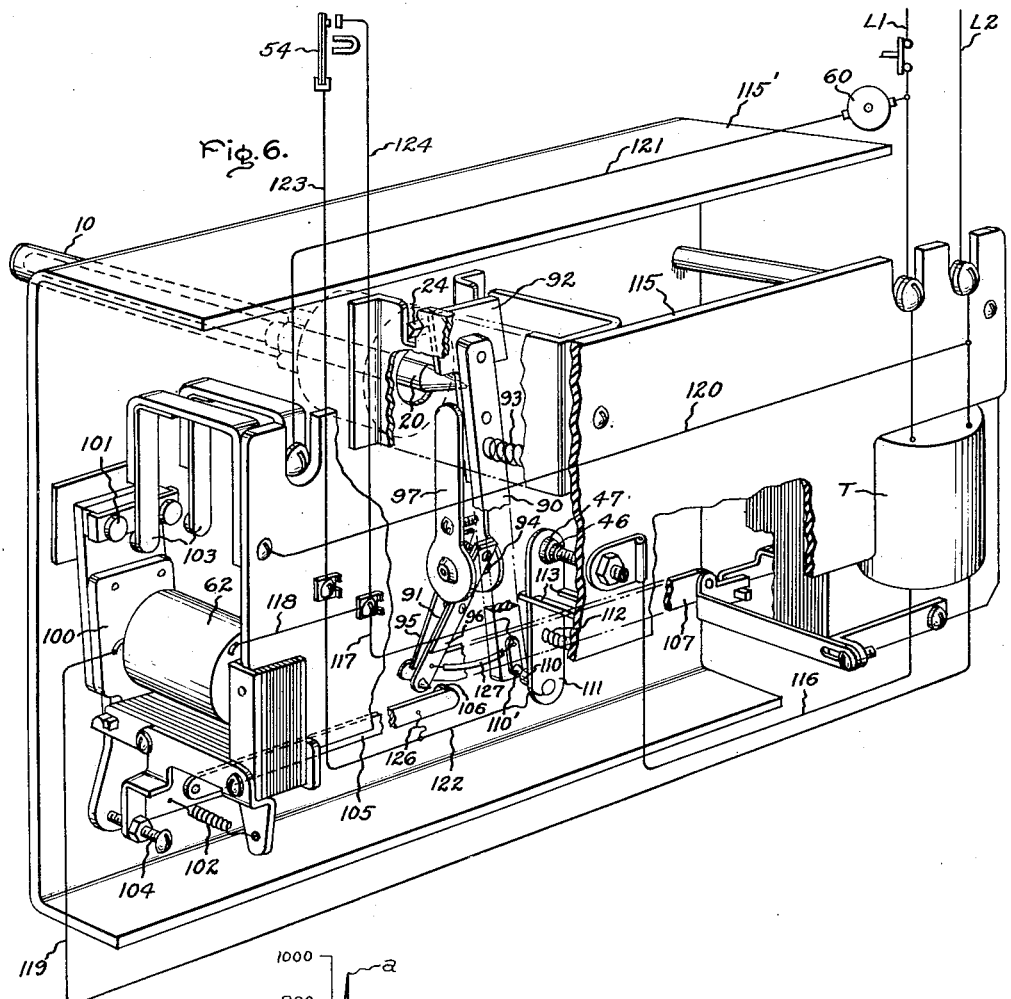

Patented Apr. 25, 1950

2,505,388

UNITED STATES PATENT OFFICE 2,505,388

SELECTIVE VARIABLE CONDITION CONTROL

John Eaton, Schenectady, N. Y., assignor to General Electric Company, a corporation of New York Application January 29, 1945, Serial No. 575,133

17 Claims. (Cl. 236—15)

The invention relates to selective variable condition control, and particularly to a self-adjusting selective variable condition responsive circuit control device suitable for automatic stoker holdfire control or other automatic control service where it is desired selectively to control in accordance with both small and large undulatory variations of some essential but widely variable condition such as temperature, pressure, speed, water level, or the like.

The principal object is to provide an improved selective variable condition responsive control device that will not only reversely control in response to small variations of a condition away from and towards a predetermined value, but also is capable of selectively and progressively varying or adjusting its control response upon progressive undulations of the condition towards said value after a predetermined larger reverse variation of the condition.

A further object is automatically to render the selective variable condition responsive control device progressively responsive to each of a series of oscillations of the condition through a variable range towards a predetermined limit thereof.

A still further object is to provide an improved reversely adjustable clutch type of variable condition responsive circuit control device capable of self-adjustment to respond selectively to both small and large reverse variations of the condition away from and towards a predetermined minimum limit of a variable range. This improvement enables the device to adjust the clutch in one direction and then progressively adjust the clutch in the opposite direction so as to control in response to a series of oscillations of the condition towards the minimum limit of a variable range, and automatically to self-adjust the particular values of the condition at which its control is effected until the minimum limit is reached.

Another object is to provide automatic electroresponsive means successively operable under the control of a variable condition responsive circuit control device for progressively varying the response thereof to variations of the condition towards a predetermined value.

While not limited thereto, the improvements provided by the present invention are particularly advantageous in electric motor driven stoker hold-fire responsive control or other similar service wherein some essential but widely variable condition such, for example, as the temperature appurtenant to the stoker fire, must always be maintained at least above a certain minimum during stand-by periods in order to insure the successful automatic increase thereof to meet varying heating or other load demands over a widely variable range above such minimum.

Various forms of automatic stoker hold-fire controls have been proposed since the problem of properly starting and stopping or increasing and decreasing the stoking action so as to keep the stoker fire alive but at a desired minimum during the stand-by periods is quite critical. This is particularly true when a very low minimum stoker hold-fire is desired in domestic heating service so as to prevent overheating of the house during the stand-by operation of the stoker. However, upon automatic house heating operation of the stoker the temperature appurtenant to the stoker fire and its associated furnace-parts may reach various relatively high values. The temperature of the furnace-parts can decrease from such values only relatively slowly due to the heat storage therein.

Thus, if the stoker automatic hold-fire control device is responsive only to some desired very low minimum temperature appurtenant to the stoker fire under steady stand-by operating conditions, then the stoker fire itself is very likely to become entirely extinguished during the long interval required for the very high temperatures of the associated furnace-parts reached during an automatic heating load operation of the stoker to decrease to the desired minimum value.

Hence a specific object of the present invention is to overcome the hold-fire control difficulties by automatically varying the response of the automatic stoker hold-fire temperature responsive control device as the temperature appurtenant to the stoker fire varies through a wide range away from and towards the desired predetermined minimum hold-fire value. In this way, the stoker hold-fire reversing control device becomes automatically self-adjusting and selectively varies its response throughout the wide range of stoker temperatures so as more effectively to insure keeping the stoker fire alive during transient stand-by periods between widely varying stoker heating load operations, while still providing the desired low minimum stoker fire temperature under steady stand-by conditions.

Since exhaustion of the fuel supply may cause the stoker fire to become extinguished, a further specific object is to provide an improved combination of stoker out-fire control with the improved selective hold-fire control so as to stop further automatic stoker operation in case the fire ever becomes extinguished.

The improvements provided by the present invention may be more fully understood by reference to the accompanying drawings in which Fig. 1 is a perspective view of a self-adjusting slip clutch selective variable temperature responsive circuit controlling device embodying one form of the invention; Figs. 2 and 3 are side views of the control device of Fig. 1 with the selective control members in different operating relations; Fig. 4 schematically shows a thermostatically controlled electric motor driven stoker with the improved self-adjusting slip clutch selective control device of the present invention arranged for hold-fire service; Fig. 5 is a perspective view of a modified form of stoker hold-fire selective control provided with an electro-responsive relay for controlling the energization of the stoker driving motor, and also effecting upon each energization thereof a progressive adjustment of the hold-fire temperature responsive control switch until the desired minimum hold-fire temperature is reached with the circuits indicated diagrammatically; Fig. 6 is a perspective view of a further modified stoker hold-fire selective control utilizing an electro-responsive stoker control relay for effecting automatic progressive adjustment of the stoker hold-fire responsive thermostat with the circuits also indicated diagrammatically; and Fig. 7 is a chart showing a typical progressive decrease of the hold-fire temperature control to the minimum value that can be obtained by means of the present invention.

As shown in Fig. 1, the improved self-adjusting selective variable condition responsive control of the present invention is provided with an automatic temperature responsive actuator 10 of the expansible tube and rod type suitable for application in stoker hold-fire control service, as indicated in Fig. 4. As shown, the outer expansible tube 11 is provided with an annular mounting head 12 detachably screw threaded into the mounting boss 13 which may be peened over, as shown, to secure the pivot frame 14 to the main mounting plate 15. The outer end of expansible tube 11 carries a sealing head 16 provided with a suitable socket for seating one end of the relatively nonexpansible rod 18. The other end of rod 18 is inserted into a tubular member 19 from which the pointed actuating pin 20 projects. Thus, when tube 11 is subjected to opposite temperature variations such as may result from variations in the combustion of the stoker fire, the difference in expansion and contraction between the expansible tube 11 and the relatively nonexpansible rod 18 becomes effective to oppositely or reversely move the actuating pin 20.

The pointed end of pin 20 engages with a conical seat or depression formed in the end of the adjustable stud 21 which is screw threaded into the channel shaped pivoted operating arm 22 and is held in its adjusted position by the lock nut 23. The operating arm 22 is provided at its lower end with a knife-edge pivot bearing bar 24 which may be secured to the arm 22 by welding, as indicated, with the ends of the bar extending beyond or overlapping the sides of the arm 22 so as to pivotally engage with spaced apart open pivot seats 25 formed in the pivot frame 14, as shown.

A tension spring 27 is anchored at one end on the finger 28 extending upwardly from the frame 14 and the other end of spring 27 extends through a suitable opening formed in arm 22 to encircle the anchoring pin 29 that is seated in suitable notches formed in the channel sides of the operating arm 22. The tension spring 27 tends to maintain the pivot bar 24 in proper seating alignment with its open pivot seats 25, as well as the pointed end of pin 20 in firm operating engagement with its seat in the adjustable stud 21. Thus, the tension spring 27 serves to take up lost motion in the actuator parts and the removal of the spring enables all parts to be disassembled readily for inspection, repair or replacement.

The actuating arm 22 is provided with the clamping fingers 31 which are pressed into clamping engagement with the square shank 32 of the friction clutch head 33, preferably formed of molded insulating material with conical or inwardly tapering recesses formed in the opposite ends thereof. The reversely movable control member in the form of switch contact 34 is carried on a channel shaped bracket 35 formed of somewhat resilient material with the inwardly tapering conical shaped friction faces 36 formed in the ends of the bracket arms 37. The tension spring 38 is interconnected between the bracket arms 37 so as to exert a force tending to press the friction faces 36 into firm frictional engagement with the conical recesses formed in the clutch head 33 and thereby cause the bracket 35 to carry contact 34 bodily along with the operating arm 22 until the friction load is exceeded.

The friction clutch head 33 also is provided with a rigid stop arm 40 that extends centrally into the path of the contact mounting bracket 35 so as to limit the slip rotational movement of the contact carrying bracket 35 in the clockwise direction. This stop arm 40 is aligned to move between the two spaced apart stationary stops 41 which extend outwardly from the insulated bar 42 into the path of movement of the contact carrying bracket 35.

A cooperating switch contact 43 is carried on a pivotal mounting bracket 44 and is biased by the compression spring 45 into the path of the movable switch contact 34. The pivoted bracket 44 also carries a contact 46 which is biased by the compression spring 45 into circuit closing engagement with the cooperating contact 47 carried on the resilient wipe arm 48 that is provided with the mounting end terminal connecting fastenings 49.

As shown more clearly in Figs. 2 and 3, the pivoted bracket 44 is carried on the pivot pin 50 and together with the compression spring 45, and also the out-fire control switch contacts 46, 47 are mounted in an insulating support 51 which may be formed of a suitable insulating material and suitably secured to the main mounting plate 15.

*Operation*

The improved self-adjusting variable temperature responsive switch structure shown in Figs. 1, 2 and 3 may be applied to stoker hold-fire control service in the manner indicated schematically in Fig. 4. The expansible rod and tube actuator 10 is subject to variations in the temperature appurtenant to the stoker fire pot 52. Fuel and air are supplied to the fire pot 52 by the electric motor driven stoking mechanism 53 which normally is operated under the control of the room thermostat 54 in order to operate the furnace 58 to supply a variable heating load such, for example, as a domestic house heating load.

As schematically shown, the stoker driving motor 60 is energized from the electric supply lines L1, L2 upon energization and closure of relay 62. The relay 62 is energized from the low voltage secondary of transformer T when the room thermostat 54 closes, the circuit extending through conductors 55, 56, out-fire contacts 46, 47, conductors 57, the winding of relay 62, and conductor 58.

In order to keep the fire alive during the stand-by periods, the stoker operating relay 62 also is connected to be energized through the out-fire control switch contacts 46 and 47 and conductor 59 whenever the stoker hold-fire switch contacts 34 and 43 are in circuit closing engagement. By adjustment of the adjustable stud 21, the slip limit stop finger 40 can be made to engage with the bracket 35 to prevent slip of the bracket in the clockwise direction due to the engagement of the movable hold-fire switch contact 34 with the cooperating contact 43 when the temperature of the stoker fire pot is at the desired predetermined minimum value at which the fire will stay alive.

With the switch parts thus adjusted whenever the stoker fire temperature decreases to the minimum safe hold-fire value, the hold-fire contacts 34 and 43 will engage and energize motor 60 to supply fuel and air to increase the combustion and thereby reverse the temperature variation. As the temperature increases, tube 11 expands and thereby enables the tension spring 27 to move the switch actuating arm 22 to the right about the knife-edge pivot bearing provided by the bar 24 to separate the movable contact 34 from the cooperating contact 43, thereby stopping operation of the stoker to prevent further increase in the fire temperature. Under steady stand-by conditions, when there is practically no call for operation of the stoker by the load responsive thermostat 54, the hold-fire switch contacts 34 and 43 will thus be closed and opened to maintain the stoker fire temperature substantially at the desired minimum value.

When a heating load operation of the stoker is initiated by the load responsive thermostat 54, the temperature to which the tube 11 is subjected will then increase and may reach a relatively high value dependent upon the extent of the load responsive operation of the stoker. Under such increased temperature conditions, tube 11 may continue to expand until the bracket 35 is carried far enough to the right to engage with the stops 41, as indicated in Fig. 2. Thereupon, as tube 11 continues to expand, a counterclockwise slippage of the clutch bracket 34 relative to the clutch head 33 occurs. The extent of this counterclockwise slippage is dependent entirely upon the extent of the continued expansion of tube 11 due to the load responsive operation of the stoker.

When the demand of the load responsive thermostat 54 is satisfied and the load responsive operation of the stoker is stopped, the stoker fire pot 52 may have reached a relatively high temperature and then due to the heat stored therein cool down relatively slowly from such temperature. However, as the tube 11 contracts in response to the cooling down of the fire pot 52, the switch operating arm 22 is moved to the left about the knife-edge pivots 24 and carries the movable contact 34 and the clutch bracket 35 bodily along as a unit therewith. Consequently, due to the counterclockwise slippage of the clutch parts, the movable contact 34 may be brought into engagement with the cooperating contact 43 when tube 11 has cooled to some temperature value materially above the steady hold-fire temperature value. The engagement of contacts 34 and 43 energizes relay 62 to start the stoker motor 60 into operation. Even though the stoker mechanism 53 is started into operation upon the engagement of contact 34 with contact 43, the cooling down of the stoker fire pot 52 and consequently of tube 11 is not immediately checked since some little time necessarily is required for the operation of the stoker mechanism to increase the stoker combustion sufficiently to overcome and reverse the prevailing cooling action. Therefore, temporarily the temperature of the fire pot continues to decrease and contact 34 will be pressed against contact 43 with a force that is insufficient to flex the compression spring 45 but is sufficient to effect a slippage of the bracket 34 in a clockwise direction relative to the friction clutch head 33.

As a result, a transient hold-fire operation of the stoker is initiated before the fire can die down to the point where it might become extinguished. Such transient stoker hold-fire operation is continued until the temperature of tube 11 is increased sufficiently to disengage contact 34 from the cooperating contact 43 and stop the transient hold-fire operation.

Upon the further cooling of the fire pot 52, a re-engagement of the hold-fire contacts 34 and 43 may be effected when tube 11 has cooled to a temperature below the initial transient hold-fire temperature but still above the minimum standby hold-fire temperature. Again some slippage of the bracket 35 in a clockwise direction will occur during the time necessarily required for each transient stoker hold-fire operation to overcome and reverse the prevailing cooling action so that the next succeeding engagement of the hold-fire contacts 34 and 43 will be effected at a still lower temperature. Due to this progressive slip clutch adjustment, the temperature at which each transient hold-fire stoker operation is effected will progressively decrease through a series of values until the bracket 35 is slipped in the clockwise direction sufficiently to engage with the slip limit stop arm 40. Thereupon, further slippage of the bracket 35 is arrested and the hold-fire stoker operations consequently will occur at the desired minimum steady hold-fire temperature value predetermined by adjustment of stud 21. In this limiting position of the operating arm 30 with respect to the control arm 35, opening of the out-fire contacts 46, 47 by temperature undershoot and consequent overtravel of the arm 40 is precluded by the pipe provided at the contact 47 (see Figs. 2 and 3).

In case for any reason the stoker fire should ever become extinguished, then the continued contraction of the tube 11 will press the hold-fire contacts 34 and 43 into engagement with sufficient force due to the slip limit stop arm 40 to overcome the force of the compression spring 45 and thereby pivot the bracket 44 to separate the out-fire contacts 46, 47, as shown in Fig. 3. Upon the opening of the out-fire contacts 46, 47, the energizing circuit of the stoker operating relay 62 is interrupted.

Thus, it will be seen that the improved self-adjusting stoker hold-fire temperature selective control of the present invention effects engagement of the control contacts 34, 43 upon each of a succession of unequal reverse oscillations of the stoker temperature through a variable range toward the minimum steady stoker hold-fire temperature, as indicated in the chart of Fig. 7. This is due to the fact that a relative adjustment of the switch contact bracket 35 is produced by progressively slipping the clutch upon each oscillation of the stoker fire temperature toward the minimum steady stoker hold-fire temperature, while the stop 40 prevents any further slipping of the clutch due to the engagement of the hold-fire contacts 34, 43 when the minimum limit is reached.

In the modified form of automatic stoker hold-fire control shown in Fig. 5, the electroresponsive stoker driving motor control relay 62 is provided with an operating arm 63 for cooperating with the movable arm 64 which carries the hold-fire switch contact 43 so as to effect a more positive slippage of the bracket 35 with respect to the clutch head 33 upon each stoker hold-fire operation above the minimum steady stoker hold-fire temperature. This modification insures that, irrespective of the cooling of the stoker furnace parts, a more positive progressive adjustment of the movable contact 34 will be produced so as to progressively decrease the response temperature at which each transient stoker hold-fire operation is produced until the minimum steady hold-fire value is reached.

As shown in Fig. 5, the relay armature 65 is pivotally mounted on the pin 66 and is biased by the tension spring 67 to separate the bridging contacts 68 which control the energizing circuit of the stoker motor 60 through the conductors 70 and 71 from the main power supply lines L1, L2.

Tension spring 67 is strong enough to pull arm 63 against the movable arm 64 with a force sufficient to maintain spring 69 under tension and move arm 64 into engagement with the stop screw 70 whenever the relay 62 is deenergized.

Relay 62 is energized upon closure of the stoker furnace heating load responsive thermostat 54 through a circuit extending from the secondary of the transformer T, conductor 73, the winding of relay 62, conductors 74 and 75, thermostat 54, conductor 76, bracket 77, flexible shunt 78, the out-fire contacts 46, 47, and conductor 79. The resulting closure of the bridging contacts will energize the stoker driving motor 60.

The relay 62 also is energized upon closure of the hold-fire contacts 34 and 43, with the circuit in this case extending from conductor 75 through the flexible shunt 52 to the bracket 35, and thence through contacts 34, 43, the pivoted member 64, and thence through the out-fire contacts 46, 47 and conductor 79.

*Operation of Fig. 5*

As shown, the parts of the stoker automatic hold-fire control mechanism are in their relative positions for maintaining a steady stoker hold-fire since the stop 40 is shown in engagement with the bracket 35 so as to arrest slippage of the friction clutch mechanism upon engagement of the hold-fire contacts 34, 43. The resulting energization of relay 62 will energize the stoker driving motor and the resulting increase in the temperature to which the actuator 10 is subjected will result in the separation of the contacts 34, 43. In this way, the stoker fire will be maintained alive under steady stand-by conditions with the fire at a desired minimum temperature value.

When a heating load responsive stoker operation occurs, then actuator 10 will be subjected to the materially higher temperatures resulting from the increased stoker fire. Under these conditions, the expansion of tube 11 will carry the bracket 35 into engagement with the adjustable stop pin 81 and thereby produce a slippage of the clutch dependent upon the extent of the increase in the stoker fire temperature.

When the heating load operation of the stoker is completed and the stoker fire pot begins to cool, the resulting contraction of tube 11 will carry the contact 34 into engagement with contact 43 at a temperature materially above the steady stoker hold-fire temperature so as to energize relay 62 and produce a transient stoker hold-fire operation to prevent the fire going out before the fire pot can cool down to the normal steady hold-fire temperature.

In this case, energization of the relay 62 will quickly move the arm 63 out of engagement with the arm 64. As a result, the tension spring 69 is free to pivot the arm 64 about the out-fire contacts 46, 47 as a fulcrum and move the left-hand end of the arm 64 that extends between the pins 83 to rotate the inertia time delay flywheel 84 about its axis until the adjustable stop screw 85 is carried by the arm 64 into engagement with the stop plate 86. The resulting time delay pivotal movement of the arm 64 gradually and smoothly presses contact 43 against the movable contact 34 with sufficient force to effect a predetermined slip rotation of the bracket 35 relative to the clutch head 33 without jarring contact 43 and 34 apart. The amount of this slippage is predetermined by the adjustment of screw 85. Thus, when each transient stoker hold-fire operation is terminated by expansion of tube 11 to effect the separation of contact 34 from contact 43 to deenergize the relay 62, then the next succeeding hold-fire operation will be produced at a lower temperature of the stoker fire pot due to the enforced slippage of the clutch parts. Each succeeding hold-fire operation will result in a further slippage of the clutch parts until the stop arm 40 finally prevents further slippage when the desired minimum hold-fire temperature is reached.

In the further modified form of automatic stoker hold-fire control shown in Fig. 6, the fire temperature responsive actuator 10 reversely moves the operating pin 20 to operate the switch arm 90 to control the operations of the stoker under steady hold-fire conditions and also the slip clutch actuated control member 91 to provide transient hold-fire stoker operations at a series of temperature values above the desired steady hold-fire temperature. As shown, the reversely movable pin 20 engages with the pivoted member 92 which is pivotally supported on the knife-edge bar 24. The switch member 90 is carried by the pivoted member 92 and engages with one end of the compression spring 93 that serves to hold the pivot operating parts in engagement, and also bias the member 92 to follow the movements of the operating pin 20.

The slip clutch operated contact member 91 is shown as of the improved adjustable wipe type more fully described and claimed in my copending application Serial No. 575,134, filed concurrently herewith, now Patent No. 2,423,693, dated July 8, 1947. As shown, the slip clutch actuated switch member 91 is formed of resilient material and is pivotally supported on an insulating trunnion block 94 between the two relatively adjustable rigid stop members 95, 96 that jointly serve to variably limit the resilient movement of switch member 91. The trunnion block 94 is carried in frictional slip clutch relation between the two somewhat resilient arms 97 which are fixedly secured at their upper ends to the knife-edge pivoted member 92, preferably by welding.

Both the steady hold-fire control switch member 90 and the transient hold-fire control switch member 91, as well as the room thermostat 54, are interconnected to control the energization and deenergization of the stoker driving motor control relay 62. In the modified form of relay 62 shown in Fig. 6, the centrally pivoted relay armature 100 carries at its upper end the bridging contacts 101 for closing and opening the energizing circuit of the stoker driving motor 60. Tension spring 102 biases the armature 100 to move the bridging contact 101 away from the cooperating contacts 103, and the adjustable stop screw 104 serves to limit the pivotal movement of armature 100 in accordance with its bias.

The lower part of the armature 100 carries a lateral extension 105 upon which a contact 106 is mounted in cooperating circuit closing relation with the slip clutch actuated contact member 91. Thus, extension 105 and contact 106 serves to produce a slipping of the clutch actuated switch member 91 upon each energization of the stoker operating relay 62 during transient hold-fire conditions. An adjustable stop member 107 extends into the path of the clutch actuated switch member 91 so as to effect an opposite slippage of the clutch when the actuator 10 is subjected to relatively high temperatures during load responsive operation of the stoker under the control of the room thermostat 54.

The steady hold-fire control switch member 90 cooperates with a contact 110 carried on the centrally pivoted out-fire switch member 111 which is biased by spring 112 to turn on the pivot brackets 113 so as normally to maintain the out-fire control contacts 46 and 47 in circuit closing engagement.

In the modified form of control shown in Fig. 6, the several wiring terminals and some of the current carrying switch parts are mounted upon an insulating panel 115 which is shown partially broken away to reveal the structural details of the switch operating parts and is provided with a channel shaped main mounting frame 115' for partially enclosing these parts.

*Operation of Fig. 6*

The switch parts are shown in their relative positions for steady hold-fire control operation. Under these conditions, a decrease in temperature of actuator 10 to the minimum hold-fire value will result in engagement of contact 110' carried on the end of the switch member 90 with the cooperating contact 110. This will energize the stoker operating relay 62 through a circuit that may be traced from the low voltage secondary of transformer T through conductor 116, out-fire contacts 46, 47, pivoted switch member 111, steady hold-fire control contacts 110, 110', conductors 117 and 118, relay 62 and conductor 119. As a result, the relay armature 100 is attracted to close the bridging contacts 101 with the cooperating contacts 103 and thereby complete an energizing circuit for the stoker driving motor 60 extending from the supply lines L1, L2, through the conductors 120, 121. Since the clutch actuated switch member 91 is shown disengaged from contact 106 carried by extension 105, no slippage of the clutch will occur upon the pivotal movement of armature 100 to the attracted position under steady hold-fire control conditions.

As soon as the operation of stoker motor 60 produces an increase in the stoker fire temperature to which actuator 10 is responsive, contact 100' is disengaged from contact 110 and relay 62 is deenergized to disengage the bridging contact 101 and thereby stop operation of the stoker motor 60. In this way, switch member 90 is operated by actuator 10 to close and open an energizing circuit for relay 62 to operate stoker motor 60 to maintain the stoker fire temperature substantially at the desired minimum value.

If now the room thermostat 54 closes its contacts, relay 62 is energized to produce a load responsive operation of the stoker motor 60. In this case, the energizing circuit for relay 62 extends through conductor 116, out-fire contacts 46, 47, pivoted member 111, conductors 122 and 123, room thermostat 54, conductors 124, 118, relay 62, and conductor 110. In case the room thermostat load responsive operation of stoker motor 60 is long continued, actuator 10 may become subjected to a relatively high temperature such, for example, as indicated by the point *a* in Fig. 7. As a result, operating pin 20 moves to the left and member 92 is caused to follow this movement by spring 93, thereby carrying arms 97 and switch member 91 bodily therewith until stop member 95 engages with the adjustable stop member 107. Thereupon, further movement of the members 97 to the left will produce a slipping of the trunnion member 94 in the counterclockwise direction. The extent of this counterclockwise slipping will depend upon the extent of the temperature rise to which actuator 10 is subjected.

When heating load responsive stoker operation is completed and actuator 10 begins to cool from a high temperature, such as *a* in Fig. 7, the clutch actuated switch member 91 will be brought into engagement with the cooperating contact 106 due to the preceding counterclockwise slippage of the trunnion member 94 when the temperature of actuator 10 is well above the minimum steady hold-fire temperature value as, for example, at the point *b* in Fig. 7. Such engagement of the transient hold-fire control member 91 with contact 106 will result in energizing relay 62 through a circuit extending from the secondary of transformer T through conductor 116, out-fire contacts 46, 47, pivoted member 111, conductor 122, thence through a flexible lead 126, contacts 106, and transient hold-fire control switch member 91, flexible lead 127, and conductors 117 and 118, relay 62 and conductor 119.

In this case, energization of relay 62 not only produces operation of the stoker motor but also effects a positive slipping of the trunnion member 94 in the clockwise direction. This is accomplished since the attraction of armature 100 moves the extension 105 and contact 106 to flex the transient hold-fire switch member 91 away from stop 96 and into engagement with the limit stop 95 and thereby transmit force through stop 95 to slip trunnion 94 clockwise relative to the friction clamping members 97. As a result of this clockwise slipping, switch member 91 is automatically adjusted to produce the next succeeding transient hold-fire operation at a lower temperature value, as, for example, the value *c* indicated in Fig. 7. The amount of clockwise slipping of the trunnion clutch member 95 produced upon each energization of the relay 62 is controlled by the adjustment of the stop screw 104.

During each transient hold-fire operation, the temperature appurtenant to the stoker fire is increased. This causes the operator 10 to retract the pin 20, and thereby allow spring 93 to rotate the circuit controlling switch members 90 and 91 in a clockwise direction. Such increase in the stoker fire pot temperature will continue until the contact wipe provided by the resilient switch member 91 moving between the resilient motion limit stops 95 and 96 is completed. Thereupon, a further increase in the stoker fire pot temperature will disengage contact 91 from the cooperating contact 106 and thereby terminate the transient hold-fire stoker operation. Thus it will be seen that by relative adjustment of the resilient contact wipe limit stops 95, 96, the increase in stoker fire pot temperature required to terminate each transient stoker hold-fire operation may be regulated.

Hence, as indicated in Fig. 7, a series of transient hold-fire stoker operations *bcdefg* are produced as the fire pot gradually cools with each successive hold-fire operation at a lower temperature value of the actuator 10 than the preceding, as indicated, until steady hold-fire temperatures are reached. When this occurs, switch member 90 will move its contact 110' into engagement with contact 110 to operate the stoker sufficiently to maintain the steady hold-fire temperature at the desired minimum value at points $h_1$, $h_2$. With the electroresponsive relay 62 automatically and progressively varying the response of the stoker fire temperature responsive actuator 10 in the improved manner shown in Figs. 5 and 6, a progressive series of transient hold-fire stoker operations is produced to effect a gradual transition of the stoker fire from the heating load condition to the steady hold-fire condition.

In case the stoker fire should ever go out, then actuator 10 will be subjected to temperatures lower than the minimum hold-fire temperature and thus move member 90 to force contact 110' into engagement with contact 110 to compress spring 112 and thereby separate the hold-fire control contacts 46 and 47. This results in interrupting the energizing circuit for relay 62 and thereby preventing any further operation of the stoker.

What I claim as new and desire to secure by Letters Patent of the United States, is:

1. A variable condition responsive control having, in combination, an operating element responsive to variations in a condition, an electroresponsive device having control means provided with one actuating member operated by said element for effecting a predetermined control in response to variation of said condition to a predetermined value and provided with a relatively adjustable actuating member having a clutch mechanism jointly adjustable by said element and said electroresponsive device in response to unequal reverse oscillation of said condition toward said value for effecting said predetermined control upon variation of said condition to each of a variable series of values of said condition ending with said predetermined value, and adjustable stop means for limiting the adjustment of said clutch mechanism and thereby regulating said values of said condition.

2. A variable condition responsive control device having, in combination, a pair of relatively adjustable movable members, electrical control means operable by either of said members upon movement thereof to a predetermined position, means for moving each of said members including an element responsive to variations in a condition and connected to move one of said members to and from said predetermined position thereof upon variation of said condition to and from one limit of a predetermined range, means including clutch mechanism for effecting a relative adjustment of the other of said members in one direction upon variation of said condition beyond the other limit of said range and thereby render said other member movable by said element to said predetermined position thereof in response to a subsequent variation of said condition toward said one limit, and electrical means under the control of said control means for effecting a relative adjustment of said other member in the opposite direction upon each operation of said other member to said predetermined position and thereby vary the subsequent variation of said condition toward said one limit required to effect movement of said other member to said predetermined position until said one limit is reached.

3. A variable condition responsive circuit control device having, in combination, a pair of relatively adjustable movable switch members for controlling a circuit, a common operating means for each of said members including an element responsive to variations in a condition connected to operate one of said members to and from a predetermined circuit closing position upon variation of said condition to and from one limit of a predetermined range, means including a friction slip clutch for effecting a relative adjustment of the other of said switch members in one direction upon variation of said condition beyond the other limit of said range to render said other switch member operable by said element to a predetermined circuit closing position in response to a subsequent variation of said condition toward said one limit, and electroresponsive means under the control of said other switch member for effecting a relative adjustment of said other switch member in the opposite direction upon each operation of said other member to said predetermined circuit closing position and thereby vary the subsequent variation of said condition toward said one limit required to effect operation of said other member to said predetermined circuit closing position.

4. An electroresponsive control device having, in combination therewith, a pair of movable switch members having corresponding control positions for selectively controlling the energization of said device, one of said members having an adjustable slip clutch operating connection, means for operating said members including an actuating element responsive to variations in a condition and connected to operate said one member through said adjustable slip clutch operating connection and connected to operate the other of said members to a predetermined control position when said condition reaches one limit of a predetermined range, means for adjusting said slip clutch connection in one direction upon variation of said condition beyond the other limit of said range to render said one member operable to the corresponding control position in response to a subsequent variation of said condition towards said one limit, and means operable by said electroresponsive device for adjusting said clutch connection in the opposite direction upon each operation of said one member to said corresponding control position and thereby vary the subsequent variation of said condition towards said one limit required to effect operation of said one member to said control position until said one limit is reached.

5. An electroresponsive control device having, in combination therewith, a pair of movable switch members for selectively controlling the energization of said device, one of said members having a slip clutch operating connection, a common operating means for said members including an actuating element responsive to variations in a condition and effective to operate the other of said members to control said device only when said condition reaches a predetermined value, means operated by said electroresponsive device for slipping said clutch connection upon each operation of said one member by said element to energize said device responsively to variation of said condition from a second predetermined value towards said first value, and stop means for reversely slipping said clutch connection upon variation of said condition to said second value to render said one member effective to control said device.

6. A selective variable condition reversing control having in combination, control means including a reversely movable control member having a jointly movable actuating member provided with an adjustable clutch mechanism for moving said control member to and from a predetermined control position and providing relative movement of said control member in opposite directions upon corresponding adjustment of said clutch mechanism, a variable condition responsive device having connections for reversely moving said actuating member jointly with said control member and having selective means for adjusting said clutch mechanism to provide relative movement of said control member in the direction of said control position upon a relatively large variation of said condition from a predetermined value and to provide relative movement of said control member in the opposite direction upon smaller subsequent variation of said condition towards said value and provided with stop means for insuring a predetermined adjustment of said clutch mechanism to effect operation of said control member to said predetermined control position when said condition reaches said value.

7. A stoker hold fire control having in combination, stoker control means including a control member reversely movable for reversely varying the stoker fire temperature and having a relatively movable actuating member provided with an adjustable clutch mechanism for moving said control member to both increase and decrease the stoker fire temperature with said members in different relative positions, a stoker fire temperature responsive device having connections for reversely operating said actuating member and provided with selective means for adjusting said clutch mechanism to vary the relative positions of said members in a corresponding direction upon predetermined variations of the stoker fire temperature towards and from a predetermined value and means including a stop for limiting the adjustment of said clutch mechanism in one direction to insure a predetermined relative position of said members when said temperature reaches said value.

8. In combination, control means having a reversely movable control element, a condition responsive device having a member reversely movable in response to opposite variations of a condition and provided with a reversely adjustable clutch for operating said control element to and from a predetermined control position, selective means for adjusting said clutch in one direction upon a predetermined operation of said element away from said position and for adjusting said clutch in the opposite direction after subsequent operation of said element to said control position, and means including a movable stop controlled by said device for effecting a predetermined adjustment of said clutch when said condition reaches a predetermined value.

9. In combination, circuit control means having a reversely movable switch element, a condition responsive operating device having a member reversely movable in response to opposite variations in a condition and provided with a reversely adjustable clutch for operating said switch element to and from a predetermined circuit control position, selective stop means for adjusting said clutch upon a predetermined operation of said switch element away from said predetermined control position and for oppositely adjusting said clutch after subsequent operation of said element to said predetermined control position, and means including a movable stop under control of said device for effecting a predetermined adjustment of said clutch when said condition reaches a predetermined value.

10. A control device having, in combination, condition responsive operating means including an operating member reversely movable responsively to variations of a condition, a cooperating member having circuit controlling means reversely operated thereby upon reverse movements thereof within a predetermined limited range, means including clutch mechanism for adjustably mounting said cooperating member on said reversely movable member for reverse movement therewith within and outside said range, selective stop means controlling said clutch mechanism to effect said reverse movements of said cooperating member within said predetermined limited range upon reverse variations of said condition within a predetermined corresponding range and selectively effective upon a predetermined variation of said condition outside said corresponding range for controlling said clutch mechanism to effect said reverse movements of said cooperating member within said predetermined limited range upon reverse variations of said condition outside said corresponding range.

11. A condition control device having, in combination, an operating element responsive to variations in a condition, electro-responsive control means having energization control means therefore provided with an actuating member reversely operable by said element to energize and deenergize said electro-responsive control means upon reverse variation of said condition within a predetermined limited range, and means including a slip clutch operable in one direction by said electro-responsive means upon energization thereof and in the opposite direction by said element upon a predetermined variation of said condition outside said range for effecting said reverse operations of said control means upon reverse variation of said condition outside said range.

12. In a hold-fire control apparatus for a stoker having a fire temperature undershoot characteristic upon initiation of stoker operation, an actuating element movable in response to the fire temperature, an operating member movable by said element from a predetermined high temperature limiting position toward a predetermined low temperature control position, first control means actuated by said operating member in passing beyond said control position to prevent stoker operation, a control member having a slipping clutch connection with said operating member, and second control means actuated by said control member recurrently to initiate stoker operation at progressively different positions of said operating member approaching said low temperature position.

13. In a hold-fire control apparatus for a stoker having a fire temperature undershoot characteristic upon initiation of stoker operation, an actuating element movable in response to the fire temperature, an operating member movable by said element from a predetermined high temperature limiting position toward and beyond a predetermined low temperature control position, first control means actuated by said operating member in passing beyond said control position to prevent stoker operation, a control member having a slipping clutch connection with said operating member, and second control means actuated by said control member to initiate stoker operation upon movement of said operating member toward said control position, said operating member overtraveling with respect to said control member due to fire temperature undershoot upon each initiating operation and thereby progressively positioning said control member with respect to said operating member for recurrent initiation of stoker operation at progressively different positions of said operating member approaching and including said control position.

14. In a hold-fire control apparatus for a stoker having a fire temperature undershoot characteristic upon initiation of stoker operation, an actuating element movable in response to the fire temperature, an operating member movable by said element from a predetermined high temperature limiting position toward and beyond a predetermined low temperature control position, first control means actuated by said operating member in moving beyond said control position to prevent stoker operation, a control member having a slipping clutch connection with said operating member, second control means actuated by said control member to initiate stoker operation upon movement of said operating member toward said control position, said operating member overtraveling with respect to said control member due to fire temperature undershoot upon each initiating operation and thereby progressively repositioning said control member with respect to said operating member for recurrent initiation of stoker operation at progressively different positions of said operating member approaching and including said control position, and lost motion means preventing actuation of said first control means in response to limited overtravel movement of said operating member beyond said control position.

15. In a hold-fire control apparatus for a stoker having a fire temperature undershoot characteristic upon initiation of stoker operation, a movable actuating element responsive to fire temperature, an operating member movable by said element in one direction upon a decrease in fire temperature, means biasing said operating member to follow said actuating element in the other direction upon increase in fire temperature, a control member having a slipping clutch connection with said operating member, fixed stop means for limiting movement of said control member in following movement of said operating member upon fire temperature increase thereby to determine an initial relative position of said control and operating members, and fixed control means engaged by said control member to initiate stoker operation upon movement of said operating member in said one direction, said operating member overtraveling upon each such engagement thereby progressively to readjust the relative positions of said control and operating members for successive recurrent engagement with said fixed control means at progressively decreasing fire temperatures.

16. In a hold-fire control apparatus for a stoker having a fire temperature undershoot characteristic upon initiation of stoker operation, a movable actuating element responsive to fire temperature, an operating member movable by said element in one direction upon a decrease in fire temperature, means biasing said operating member to follow said actuating element in the other direction upon increase in fire temperature, a control member having a slipping clutch connection with said operating member, fixed stop means for limiting movement of said control member in following movement of said operating member upon fire temperature increase thereby to determine an initial relative position of said control and operating members, fixed control means engaged by said control member to initiate stoker operation upon movement of said operating member in said one direction, said operating member overtraveling upon each such engagement thereby progressively to readjust the relative positions of said control and operating members for successive recurrent engagement with said fixed control means at progressively decreasing fire temperatures, and third stop means for limiting said readjusting movement.

17. In a hold-fire control apparatus for a stoker having a fire temperature undershoot characteristic upon initiation of stoker operation, a movable actuating element responsive to fire temperature, an operating member movable by said element in one direction upon a decrease in fire temperature, means biasing said operating member to follow said actuating element in the other direction upon increase in fire temperature, a control member having a slipping clutch connection with said operating member, fixed stop means for limiting movement of said control member in following movement of said operating member upon fire temperature increase thereby to determine an initial relative position of said control and operating members, fixed control means engaged by said control member to initiate stoker operation upon movement of said operating member in said one direction, said operating member overtraveling upon each such engagement thereby progressively to readjust the relative positions of said control and operating members for successive recurrent engagement with said fixed control means at progressively decreasing fire temperatures, third stop means for limiting said readjusting movement, and lost motion means operable at a predetermined minimum fire temperature to permit overtravel of said operating member without positional readjustment of said control member.

JOHN EATON.

REFERENCES CITED

The following references are of record in the file of this patent:

UNITED STATES PATENTS

| Number | Name | Date |
|---|---|---|
| 1,724,425 | Schaum | Aug. 13, 1929 |
| 2,089,081 | Wemple | Aug. 3, 1937 |
| 2,097,319 | Eaton | Oct. 26, 1937 |
| 2,173,798 | Baak | Sept. 19, 1939 |
| 2,209,298 | Martenis | July 23, 1940 |